United States Patent [19]

Musil

[11] Patent Number: 4,719,788
[45] Date of Patent: Jan. 19, 1988

[54] BELT FASTENER WITH ENLARGED LOOP FOR HINGE PIN

[75] Inventor: Edward C. Musil, Lyons, Ill.

[73] Assignee: Flexible Steel Lacing Company, Downers Grove, Ill.

[21] Appl. No.: 908,223

[22] Filed: Sep. 16, 1986

Related U.S. Application Data

[62] Division of Ser. No. 616,287, Jun. 1, 1984, Pat. No. 4,625,369.

[51] Int. Cl.[4] ............................................. B21D 53/46
[52] U.S. Cl. ............................................ 72/379; 29/11
[58] Field of Search ...................... 72/379, 404; 29/11; 24/33 B

[56] References Cited

U.S. PATENT DOCUMENTS 1,620,603  3/1927  Munson .................................. 29/11

FOREIGN PATENT DOCUMENTS 846158  8/1960  United Kingdom ................ 24/33 B Primary Examiner—Lowell A. Larson
Attorney, Agent, or Firm—Fitch, Even, Tabin & Flannery

[57] ABSTRACT

A belt fastener of the type formed from a blank of metal having substantially uniform thickness by a progressive die arrangement. The fastener includes a generally flat upper plate, a generally flat lower plate, strap means joining the plates and an abutment finger extending from one of the plates for limiting insertion of a belt segment moved between the plates. The finger is offset with respect to the strap means and has a thickness less than that of the blank. The finger is engageable with the strap means of another belt fastener which other fastener functions to hold an adjacent belt segment.

1 Claim, 6 Drawing Figures

U.S. Patent  Jan. 19, 1988  4,719,788
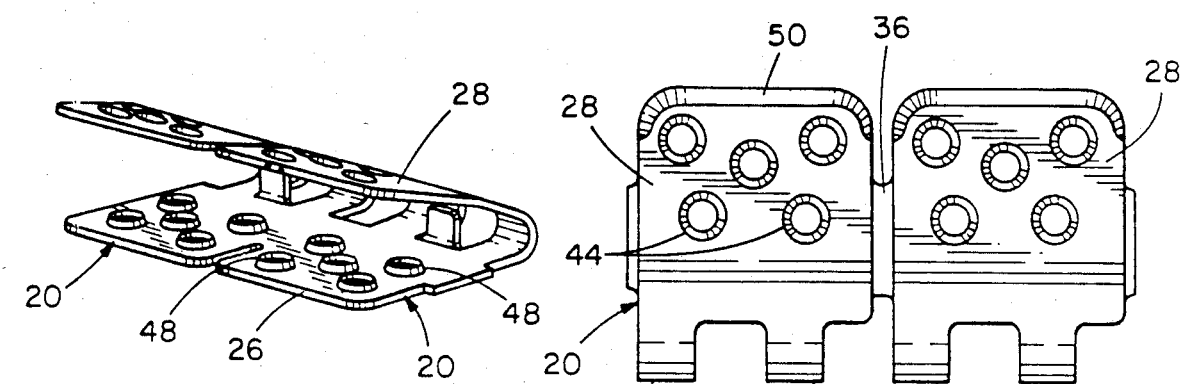
FIG.1  FIG.2
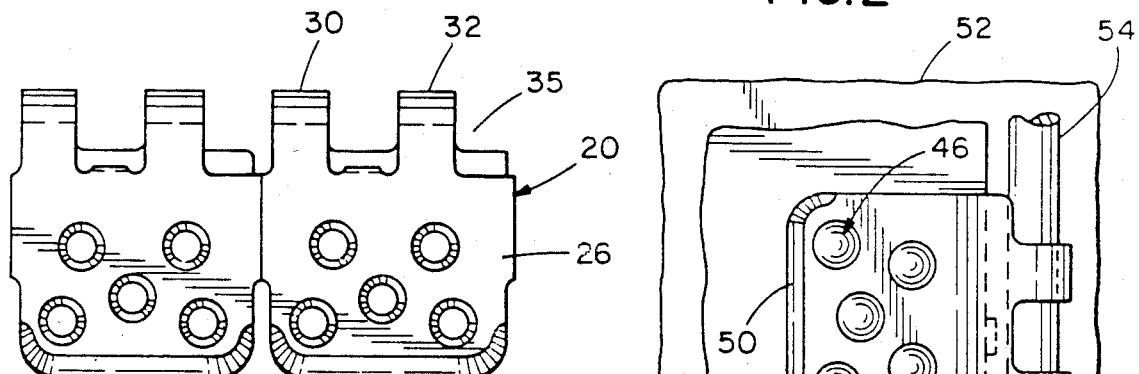
FIG.3
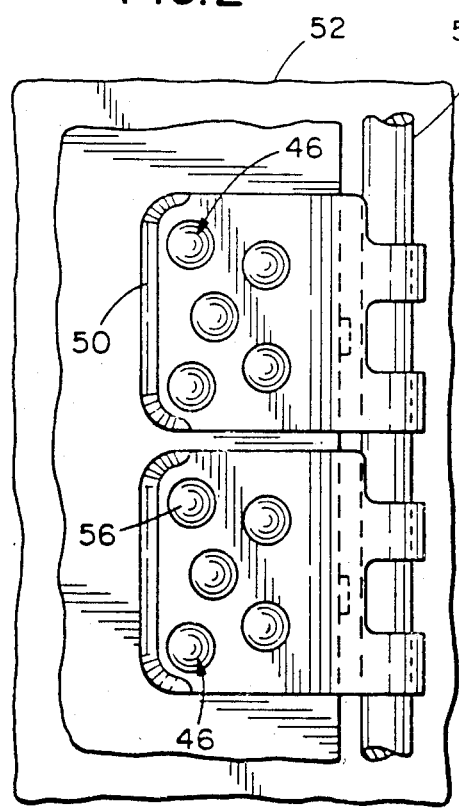
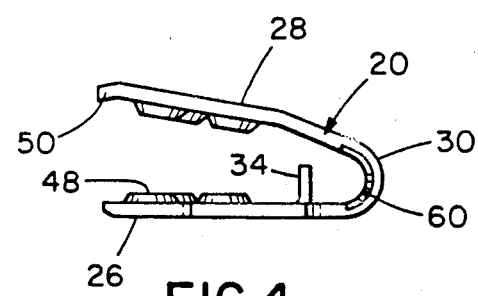
FIG.4  FIG.5
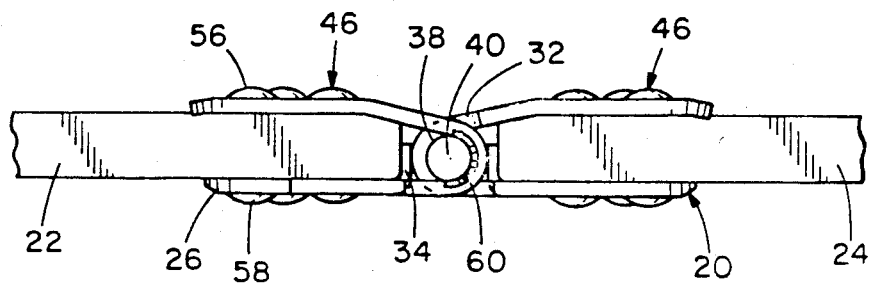
FIG.6

BELT FASTENER WITH ENLARGED LOOP FOR HINGE PIN

This is a division of application Ser. No. 616,287, filed June 1, 1984, now U.S. Pat. No. 4,625,369 granted Dec. 2, 1986.

BACKGROUND OF THE INVENTION

The present invention relates to fasteners and to the method of making the same and, more particularly, to hinge belt fasteners for use in connecting adjacent belt segments of, for example, a conveyor belt.

Hinge belt fasteners have been used extensively for joining together belt segments of an endless conveyor belt. Such fasteners include upper and lower plates joined by a pair of arcuate straps or loops so that when two fasteners are disposed back-to-back with the straps interdigitated, the various straps define an aperture for receiving a hinge pin. Some of such prior art belt fasteners include an abutment finger extending from one of the plates for limiting insertion of and locating a belt segment received by the fastener.

Such prior art belt fasteners are typically formed from a flat blank of metal by various steps of cutting, punching and bending. The abutment finger, when formed, is simply an extension of one of the plates bent at a right angle to that plate and directed toward the other plate.

These prior art belt fasteners are designed for use with a hinge pin of a predetermined cross-sectional dimension. If a particular application, due to the severity or frequency of bending, tension exerted on the belt or belt speed, dictates the use of a larger hinge pin, a larger belt fastener must be used. The larger belt fastener, being formed of thicker stock, is more expensive. Furthermore, the use of such larger belt fastener is often wasteful and unnecessarily adds weight to the completed belt assembly because the smaller gauge fastener often has the structural characteristics necessary to adequately hold a belt segment, it simply does not offer a sufficiently sized aperture for receiving the larger hinge pin. For a further description and illustration of the structure and operation of such prior art belt fasteners, reference may be made to U.S. Pat. Nos. 3,176,358 and 3,913,180.

SUMMARY OF THE INVENTION

Among the several objects of the present invention may be noted the provision of an improved belt fastener and a method of making the same. This belt fastener permits use of a larger hinge pin than prior art belt fasteners without an increase in the gauge of the metal from which the fastener was formed. Additionally, the abutment finger of the fastener provides a dual function in that it not only limits insertion of a belt segment to be held but also serves as a stop to align another fastener, disposed in back-to-back relationship with a first fastener, so that the two fasteners define an aperture for receiving a hinge pin. The belt fastener of the present invention also functions to permit relative rotational motion with a mated belt fastener while avoiding substantial translational motion or "lost motion" with respect to its mated fastener to preclude premature wearing of the completed belt. Furthermore, the belt fastener of the present invention is easy to install, is reliable in use and has long service life, and is simple and economical to manufacture. Other objects and features of the present invention will be, in part, apparent and, in part, pointed out hereinafter in the specification and attendant claims and drawings.

Briefly, the belt fastener of the present invention comprises generally flat upper and lower plates and straps joining the plates. An abutment finger extends from one of the plates for limiting insertion of a belt segment moved between the plates. The finger is offset with respect to the straps and has a thickness less than that of the blank. The finger is engageable with a strap of another belt fastener which other belt fastener functions to hold an adjacent belt segment.

BRIEF DESCRIPTION OF THE DRAWINGS

FIG. 1 is a perspective view of a pair of belt fasteners of the present invention, joined by a rupturable weakness line, for use in attachment of a belt segment to a hinge pin;

FIG. 2 is a plan of the fasteners of FIG. 1;

FIG. 3 is a bottom elevational view of the fasteners;

FIG. 4 is a side elevational view of the fasteners.

FIG. 5 illustrates the fasteners of FIG. 1 mounted on an anvil fixture for use in installing the fasteners on a belt segment; and FIG. 6 depicts fasteners mounted back-to-back by means of a hinge pin for joining adjacent belt segments.

Corresponding reference characters indicate corresponding components throughout the several views of the drawings.

DESCRIPTION OF THE PREFERRED EMBODIMENT

Referring now to the drawings, a belt fastener of the present invention for terminating a belt segment 22 and pivotally connecting it to an adjacent belt segment 24 in the formation of a complete belt assembly, is generally indicated in FIGS. 1–4 by reference character 20. The belt fastener 20 includes a lower plate 26, an upper plate 28 and arcuate strap means joining the plates. More specifically, as best shown in FIGS. 2 and 3, the strap means includes an outer loop-shaped strap 30 and an inner arcuate strap 32. Each fastener can be considered to have a longitudinal axis with the inner strap 32 disposed adjacent the axis and the outer strap 30 spaced therefrom. Disposed between the straps is an abutment finger 34, extending upwardly from lower plate 26 toward upper plate 28, for limiting insertion of the belt segment 22 between the plates. The inner strap 32 is flanked by the abutment finger and a space 35 for receiving a strap of another belt fastener 20 arranged in back-to-back relationship with fastener 20 as shown in FIG. 6.

FIGS. 1–3 and 5 show two of the belt fasteners 20 connected at their respective lower plates 26 by a rupturable weakness line 36. Although two of the belt fasteners are shown joined, it will be appreciated that any number of the belt fasteners could be so joined. Adjacent fasteners may separate at the line of weakness if the need arises.

The belt fastener 20 of the present invention is formed from a blank of metal having a substantially constant thickness through the use of a progressive die arrangement. Such progressive die arrangements, where the metal blank undergoes sequential formation due to steps such as cutting, punching and bending performed at spaced work stations, are well known to those of skill in the art and need not be further described here. In prior art belt fasteners formed by progressive dies, the abutment finger was simply bent at a right angle to the plate from which it extended. While such prior art fasteners functioned satisfactorily, they limited the size of hinge pins used to pivotally join the fasteners. In order to maintain a given "reachback", the extent of insertion of the belt segment between the upper and lower plates, the prior art abutment finger limited the extent that the various straps of back-to-back disposed belt fasteners could be interdigitated. Since the degree of strap overlap determines the size of the aperture for receiving the hinge pin, the "reachback" was maintained at the expense of limiting the size of the hinge pin.

The progressive die arrangement used in forming belt fastener 20 functions not only to bend the abutment finger 34 from the plane of the lower plate 26 but also to reduce the thickness of the finger as by coining it. The thickness of the finger is preferably reduced by twenty to thirty percent and is most preferably reduced in thickness by about twenty-five percent. Of course, the thickness of the finger can be reduced to the extent desired consistent with the maintenance of structural integrity.

The progressive die cuts a fastener blank from a flat sheet of metal to have the flat plates separate from each other by thin strips of metal which will ultimately be bent into the arcuate straps 32. A thin flat finger of metal projects forward from the lower plate portion and the blank is moved forwardly in the die in a coining station at which a punch hits this finger and coins the same to reduce its thickness from the blank metal thickness, e.g., 0.085 inch to about 0.065 inch thick. The remainder of the blank is not coined to reduce its thickness. Of course other operations may be performed simultaneously with the coining. The coined finger is subsequently bent to project normal to the lower plate. The thin strips joining the plates are bent into an arcuate shape, as illustrated, with the upper plate being substantially parallel to and spaced above the lower plate, as shown in FIG. 4, and with the abutment finger projecting into the space between the plates.

As shown in FIG. 6, the straps of a pair of the belt fasteners 20, disposed back-to-back with the strap 32 of one engaging the abutment finger 34 of the other, define an aperture 38 for receiving a hinge pin 40. As each abutment finger 34 has been reduced in thickness perhaps twenty-five percent and as the reachback has been maintained constant, the entire reduction in thickness of each of the two abutment fingers goes to increasing the diameter of the aperture, thus permitting the use of a markedly larger and stronger hinge pin. Also a variety of smaller hinge pins could be used. An advantage of using the largest hinge pin, one whose outside diameter substantially matches the diameter of the circular aperture effectively formed by the various straps 30, 32, is that the entire space between the abutment fingers is occupied by the combination of the straps and the hinge pin 40. Because substantial translational movement between the fasteners is prohibited, the possibility of premature wear in the completed belt system is reduced.

More specifically, each plate 26, 28 includes a plurality of aligned apertures 42, 44, respectively, for receiving rivets 46, best shown in FIGS. 5 and 6, to install the belt fastener 20 on its corresponding belt segment. Each aperture is defined by an inwardly directed rim 48 and the upper plate 28 is provided with a beveled edge 50 remote from the straps 30, 32. The beveled edge 50 is bent out of the plane of the upper plate 26. Referring to FIG. 4, in the as-manufactured condition of the belt fastener, the plates 26, 28 diverge away from the straps to facilitate insertion of the belt segment 22 between the plates. After installation of the belt fastener on the belt segment, the plates 26 and 28 are disposed substantially parallel with the rims 48 and the beveled edges 50 forced into the belt segment to assist in providing a firm hold.

Referring to FIG. 5, apparatus for use in installation of the belt fasteners 20 on the belt segment 22 includes an anvil fixture 52 for use in driving the rivets, and an alignment rod 54 for locating the fasteners. Other components of the installation apparatus are, in the interest of brevity, not shown; but they are fully described in commonly assigned U.S. Pat. No. 3,913,180, the teachings of which are hereby incorporated by reference. While various types of rivets can be used, the preferred type is fully described in the patent. Suffice it to say that the rivet includes a shaft and a head 56 and releasably carries at its leading end a nail like extension for being driven through the belt segment. The extension has at its trailing end an anvil surface for deforming the leading end of the rivet into a second head 58 upon the rivet passing the lower plate 26. This installation apparatus allows the belt fasteners to be installed even if the lower side of the belt segment is not fully accessible.

Operation of the belt fastener 20 of the present invention is as follows: After the appropriate number of fasteners have been installed on belt segments 22 and 24 using the installation apparatus described above, the terminated belt segments are brought together with the various straps of the respective belt segments interdigitated to form the aperture 38 which is of generally circular effective cross section. Preferably, each strap 30, 32 is provided with a beveled entry surface 60 to facilitate and guide insertion of the hinge pin 40. After all the individual belt segments have been joined, for example, to form an endless belt, the hinges formed by the adjacent hinged belt fasteners provide pivotal connections necessary for the rotational motion of the belt assembly.

As an example of the construction and dimensions of a belt fastener, the fastener 20 can be formed from a metal blank having a thickness of 0.085 inches. The abutment finger 34 is coined to decrease its thickness from 0.085 inch to a thickness of 0.065 inches. Because there is an identical 0.020 inch from coining of the other abutment of the other interdigitated belt fastener, the total provides an increased space of 0.040 inch for the diameter of the hinge pin. In the as-manufactured condition of the belt fastener, the plates 26 and 28 diverge at an angle approximately 10° while the extension 50 is bent from the plane of the upper plate 28 at a preferable angle of 20°.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A method of making a hinge belt fastener having upper and lower plates joined by a pair of arcuate straps with an inwardly projecting abutment finger on one of the plates for limiting belt insertion at a predetermined reachback distance from free ends of said upper and lower plates, said method comprising the steps of: punching a flat sheet of steel to form a pair of plates joined by flat strips and having a flat finger in the plane of said plates, coining the flat finger with a punch to substantially reduce the thickness of the flat finger on a first side thereof opposite a second side on said finger, bending the flat finger inwardly to be substantially normal to its attached plate with the second side facing the free ends of the plates and to be at said predetermined reachback distance from the free ends of the plates, and bending the flat strips into arcuate shape to form the arcuate straps and to provide an upper plate which is disposed above the lower plate and is substantially parallel thereto with the arcuate straps having inwardly facing sides facing the first side of said finger to define a space which admits a larger size of hinge pin.

* * * * *